United States Patent
Duursma et al.

(10) Patent No.: US 9,938,376 B2
(45) Date of Patent: Apr. 10, 2018

(54) PROCESS FOR PREPARING A FURAN-BASED POLYAMIDE, A FURAN-BASED OLIGOMER AND COMPOSITIONS AND ARTICLES COMPRISING THE FURAN-BASED POLYAMIDE

(71) Applicant: Furanix Technologies B.V., Amsterdam (NL)

(72) Inventors: Ate Duursma, Amsterdam (NL); Rene Aberson, Amsterdam (NL); Dee Dee Smith, Dacula, GA (US); Joel Flores, Alpharetta, GA (US); Matheus Adrianus Dam, Amsterdam (NL); Gerardus Johannes Maria Gruter, Amsterdam (NL)

(73) Assignee: Synvina C.V., Amsterdam (NL)

( * ) Notice: Subject to any disclaimer, the term of this patent is extended or adjusted under 35 U.S.C. 154(b) by 0 days.

(21) Appl. No.: 15/029,296

(22) PCT Filed: Oct. 21, 2014

(86) PCT No.: PCT/NL2014/050732
§ 371 (c)(1),
(2) Date: Apr. 14, 2016

(87) PCT Pub. No.: WO2015/060718
PCT Pub. Date: Apr. 30, 2015

(65) Prior Publication Data
US 2016/0237211 A1    Aug. 18, 2016

Related U.S. Application Data

(60) Provisional application No. 61/893,470, filed on Oct. 21, 2013.

(30) Foreign Application Priority Data

Oct. 21, 2013   (NL) ..................................... 2011656

(51) Int. Cl.
| | | |
|---|---|---|
| *C08L 77/00* | (2006.01) | |
| *C08G 69/26* | (2006.01) | |
| *C08G 69/28* | (2006.01) | |
| *C08L 77/06* | (2006.01) | |
| *C08J 5/18* | (2006.01) | |
| *C08K 11/00* | (2006.01) | |
| *C09D 177/06* | (2006.01) | |

(52) U.S. Cl.
CPC ............. *C08G 69/26* (2013.01); *C08G 69/28* (2013.01); *C08J 5/18* (2013.01); *C08K 11/00* (2013.01); *C08L 77/06* (2013.01); *C09D 177/06* (2013.01); *C08J 2377/06* (2013.01)

(58) Field of Classification Search
CPC ...... C08G 69/26; C08G 69/28; C08J 2377/06; C08J 5/18; C08K 11/00; C08L 77/06; C09D 177/06
See application file for complete search history.

(56) References Cited

U.S. PATENT DOCUMENTS

| 2,130,523 | A | 9/1938 | Carothers | |
|---|---|---|---|---|
| 7,122,618 | B2 * | 10/2006 | Witteler ................... | A61K 8/84 424/78.17 |
| 2008/0207847 | A1 | 8/2008 | Benecke et al. | |
| 2010/0280186 | A1 | 11/2010 | Benecke et al. | |

FOREIGN PATENT DOCUMENTS

| WO | 2011/043660 A2 | 4/2011 |
|---|---|---|
| WO | 2011/043661 A1 | 4/2011 |
| WO | 2012/132792 A1 | 10/2012 |
| WO | 2013/007585 A1 | 1/2013 |
| WO | 2013/085747 A1 | 6/2013 |
| WO | 2013/111517 A1 | 8/2013 |
| WO | 2013/149180 A1 | 10/2013 |
| WO | 2014/012829 A1 | 10/2014 |

OTHER PUBLICATIONS

Alex Krieger, "Über Polyamide Aus Heterozyklischen Discarbonsauren, Promotions Albeit"; Eidgenossischen Technischen Hochschule In Zurich, Jan. 1, 1961 (Jan. 1, 1961), pp. 1-81, XP055122728, Zurich.
Emerson L. Wittbecker, et al., "Interfacial Polycondensation. I.", pp. 289-297, Journal of Polymer Science, vol. XL, 1959.
Communication dated Feb. 16, 2017 from the European Patent Office for a counterpart foreign application.

* cited by examiner

*Primary Examiner* — Robert T Butcher
(74) *Attorney, Agent, or Firm* — Hoffmann & Baron, LLP

(57) ABSTRACT

A furan-based polyamide is prepared by the following steps: (1) preparing a furan-based oligomer of formula (1) $H_2N$—R—(NH—CO—F—CO—NH—R)$_n$—$NH_2$ (1) where R is a hydrocarbon moiety and F is a furan (cyclo-$C_4H_2O$) moiety and n represents the average degree of oligomerization, and where n is within the range of 1 to 10 by reacting 2,5-furandicarboxylic acid or its derivative with a diamine at a temperature of at most 100° C.; (2) contacting the oligomer of step (1) with a bifunctional linker selected from an acid or a derivative thereof where the acid is furandicarboxylic acid or a non-aromatic dicarboxylic acid; provided that if the hydrocarbon moiety R is aromatic, then the bifunctional linker is an aromatic dicarboxylic acid or a derivative thereof, at a mole ratio of the oligomer to the difunctional linker within the range of 0.8 to 1.5 at polycondensation conditions, and (3) isolating the resulting polyamide.

17 Claims, No Drawings

PROCESS FOR PREPARING A FURAN-BASED POLYAMIDE, A FURAN-BASED OLIGOMER AND COMPOSITIONS AND ARTICLES COMPRISING THE FURAN-BASED POLYAMIDE

CROSS-REFERENCE TO RELATED APPLICATIONS

This application is the National Stage of International Application No. PCT/NL2014/050732 filed Oct. 21, 2014, which claims the benefit of U.S. Provisional Application No. 61/893,470, filed Oct. 21, 2013, and of Netherlands Application No. NL 2011656, filed Oct. 21, 2013, the contents of which are incorporated by reference herein.

TECHNICAL FIELD

The present invention relates to a process for preparing a furan-based polyamide, i.e., a polycondensation polymer (homopolymer or copolymer) derived from 2,5-furandicarboxylic acid or its derivative as a main building block. It also relates to the polyamide so prepared. The definition of polyamide includes block copolymers having a polyamide block. The invention also relates to an oligomer useful in the process for preparing the furan-based polyamide and the process for preparing the oligomer. It also relates to compositions and articles comprising the polyamide.

BACKGROUND ART

Polyamides and block copolymers such as polyesteramides have been used for many years in various applications where their outstanding properties are valued. However, in the last decade, a growing trend to use plastics derived from renewable resources such as plants has been established by society in order to reduce human's carbon footprint and shift our civilization to be more environmentally-friendly. This trend translated into a huge number of projects in both the academic and industrial scientific communities. However, finding polymers reaching interesting properties while being made via affordable bio-sourced monomers and processes is not an easy task.

Recently a new technology has been developed which makes available the conversion of plant-based sugars into furanic building blocks in a cost-competitive way. A suitable method has been described in WO 2011/043660 and WO 2011/043661. The main building block obtained, 2,5-furandicarboxylic acid (hereafter referred to as FDCA), as such or in the form of a derivative thereof, can be used as a monomer in polycondensation reactions:

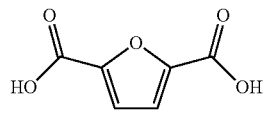 [SMILES: O=C(O)c1ccc(C(=O)O)o1]

Various proposals have been made to synthesize polyamides made from FDCA in the literature. However, the inventors have discovered that none of the experiments and the products described could be satisfactorily reproduced.

WO 2012/132792 relates to polyamides made from FDCA and an aliphatic diamine comprising 2 or 3 carbon atoms, i.e. ethylenediamine or 1,3-propylenediamine.

WO'792 describes high molecular weight polymers made by a two-step process using interfacial polymerization and low molecular weight polymers made by a more conventional polycondensation reaction in the presence of water. The described high molecular weight could not be reached, however, with the described specific conditions.

WO 2013/007585 relates to the synthesis of aromatic-aliphatic furan-based polyamides. These polyamides are not made of FDCA building blocks and diamine, but of 2,5-furan diamine or 2,5-tetrahydrofuran diamine and a diacid. In a comparative experiment, FDCA and hexamethylene diamine are reacted in the same way as known for the preparation of polyamide-6,6. However, no satisfactory polyamide is obtained. This reference concludes (at paragraph [0088]) that high molecular weight polyamides cannot be synthesized via the common salt route.

WO2013/149180 discloses a method for the preparation of aramides, i.e. aromatic polyamides. In this preparation method the dichloride of FDCA is reacted with meta-phenylene diamine. Although the application states that the aramides can have molecular weights of up to 1,000,000, the examples show that aramides were obtained with a weight average molecular weight of up to about 38,000. The method comprises contacting an aromatic diamine, such as m-phenylene diamine, with FDCA or a derivative thereof in a reaction mixture that comprises a polar solvent having a boiling point above 160° C. More in particular the method disclosed comprises dissolving m-phenylene diamine in a polar solvent selected from the group consisting of dimethyl acetamide, dimethyl formamide and dimethyl sulfoxide, under inert atmosphere. FDCA-dichloride is then added to the diamine solution at a temperature in the range of −5 to 35 or 0 to 5° C. The reaction is continued until there is no further increase in temperature or until a desired viscosity of the reaction mixture is achieved. The polymer may then be isolated from the reaction mixture. In the process a salt is added to the diamine solution before the step of adding an aromatic diacid monomer, wherein the salt may be lithium chloride, lithium oxide, calcium chloride or calcium oxide.

P. M. Heertjes and G. J. Kok, in Delft Prog. Rep. Series A 1974 p. 59, disclose the synthesis of furan-based polyamides via interfacial, melt or solution phase. Only low molecular weight, 6,000-10,000, polyamides were obtained.

H. Hopff and A. Krieger, in Makromol. Chem. 1961, p. 93, disclose the synthesis of furan-based polyamides via salt, melt and interfacial polymerization. However, strong decarboxylation was observed and low degree of polymerization was obtained (<30).

J. E. Flannigan and G. A. Mortimer, in J. Polymer Sci. 1978, p. 1221, highlight the problems of the preparation of furan-based polyamides, due to N-methylation of aliphatic amines by aromatic esters.

Finally, O. Grosshardt, U. Fehrenbacher, K. Kowollik, B. Tübke, N. Dingenouts, and M. Wilhelm, in Chem. Ing. Tech. 2009, p. 1829, disclose the melt condensation of the dimethylester of 2,5-furandicarboxylic acid (DMFDCA) using a catalyst to give low Mn (~5000) polyamides.

There is thus still a need for a process for preparing high molecular weight polyamides derived from 2,5-furandicarboxylic acid or its derivative, particularly where this concerns a bio-sourced monomer, featuring interesting thermal and mechanical properties. It has now been found that a polyamide with a satisfactory molecular weight can consistently be prepared when the polycondensation is conducted in two steps, wherein in the second step additional diacid or a derivative thereof is added.

SUMMARY OF THE INVENTION

A first aspect of the present invention is thus related to a process for preparing a furan-based polyamide, said process comprising the following steps:
(1) preparing a furan-based oligomer of the general formula:

$$H_2N\text{—}R\text{—}(NH\text{—}CO\text{—}F\text{—}CO\text{—}NH\text{—}R)_n\text{—}NH_2 \qquad (1)$$

wherein R is a hydrocarbon moiety and F is a furan (cyclo-$C_4H_2O$) moiety and n represents the average degree of oligomerization, and wherein n is within the range of 1 to 10, by reacting 2,5-furandicarboxylic acid or its derivative with a diamine at a temperature of at most 100° C.;
(2) providing a bifunctional linker selected from an acid or a derivative thereof wherein the acid is furandicarboxylic acid or a non-aromatic dicarboxylic acid; provided that if the hydrocarbon moiety R is aromatic, then the bifunctional linker is an aromatic dicarboxylic acid or derivative thereof;
(3) contacting the oligomer and the bifunctional linker at a mole ratio of the oligomer to the bifunctional linker within the range of 0.8 to 1.5 at polycondensation conditions, and
(4) isolating the resulting polyamide.

A second aspect of the present invention relates to the polyamide (P) so prepared, which is a homopolymer when the bifunctional linker is based on furandicarboxylic acid and includes copolymers comprising furan-based polyamide blocks when the bifunctional linker is based on a dicarboxylic acid different from furandicarboxylic acid. Copolymers wherein only part of the oligomers linked through the bifunctional linker are furan-based oligomers of the formula (1), may also be prepared by the above process.

A third aspect of the present invention relates to a process for preparing a furan-based oligomer of formula (1) and to such oligomer. The average degree of polymerization of such oligomer is 1 to 10, preferably from 2 to 9, more preferably from 2 to 7. The average degree of oligomerization, which is also known as degree of polymerization, is determined by NMR as explained below.

The present invention further discloses an oligomer of formula (2),

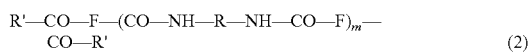

$$R'\text{—}CO\text{—}F\text{—}(CO\text{—}NH\text{—}R\text{—}NH\text{—}CO\text{—}F)_m\text{—}CO\text{—}R' \qquad (2)$$

wherein R and F are as defined above, m represents the average degree of oligomerization, and R' is a hydroxyl group, a halogen atom or an alkoxy group of 1 to 6 carbon atoms. The average degree of polymerization may vary from 1 to 30, preferably from 1 to 10, more preferably from 2 to 8.

The furan-based oligomer of formula (2) may be useful in the synthesis of polycondensation polymers with e.g. diols as bifunctional linker.

The inventors discovered that provided the temperature was strictly controlled, the reaction of an ester derivative of FDCA, in particular the dimethylester of FDCA (DMFDCA), with a diamine, allowed the manufacture of FDCA-based polyamide oligomers that can be used for the preparation of high molecular weight FDCA-based polymers. In particular, they found that the reaction medium was to be maintained at a temperature of at most 100° C. during the oligomerization of the FDCA (or its derivative) with the diamine and that this was a key parameter to obtain suitable oligomer precursors for obtaining high molecular weight polymers.

Finally, a further aspect of the present invention is related to articles comprising the same polyamide (P) such as shaped articles, fibers, coatings, films and membranes.

DETAILED DESCRIPTION OF THE INVENTION

The expression "polyamide" is typically intended to denote any polymer which comprises recurring units which are derived from the polycondensation of at least one dicarboxylic acid component or derivative thereof and at least one diamine component, and/or from the polycondensation of aminocarboxylic acids and/or lactams.

As indicated above, the polyamide may also be a copolymer. An example thereof is a polyesteramide, which may be obtained through polycondensation with cyclic esters and the like. Moreover, e.g., ester end capped furan-based oligomers may be reacted with a diol to produce high molecular weight polymers having amide and ester groups in the polymer backbone. As mentioned above, in addition to the furan-based oligomer, other oligomers may be used. In this case both the furan-based oligomer and the other oligomer(s) will be linked by the bifunctional linker to form a high molecular weight polycondensation polymer having amide groups in the polymer backbone. In certain preferred embodiments, the polyamide (P) of the present invention is made of at least 50 mol %, preferably at least 60 mol %, more preferably at least 70 mol %, still more preferably at least 80 mol % and most preferably at least 90 mol % of furan-based oligomers of formulae (1), optionally with oligomers of formula (2). Excellent results were obtained when the polyamide (P) is made solely of such oligomers, in particular oligomers of formula (1).

The expression 'derivative thereof' when used in combination with the expression 'dicarboxylic acid' is intended to denote whichever derivative which is susceptible of reacting in polycondensation conditions to yield an amide bond. Examples of amide-forming derivatives include a mono- or di-alkyl ester, in particular when the alkyl group has 1 to 6 carbon atoms such as a mono- or di-methyl, ethyl or propyl ester, of such carboxylic acid; a mono- or di-aryl ester thereof; a mono- or di-acid halide thereof; a carboxylic anhydride thereof, a mono- or di-acid amide thereof, or a mono- or di-carboxylate salt.

As mentioned, the present invention relates to a furan-based polyamide (P), i.e., a polycondensation polymer (homopolymer or copolymer) derived from 2,5-furandicarboxylic acid or its derivative as a main block. In other words, a polymer with at least a recurring unit of the general formula:

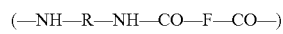

$$(\text{—}NH\text{—}R\text{—}NH\text{—}CO\text{—}F\text{—}CO\text{—})$$

wherein R is the residue of a diamine and F is a furan (cyclo-$C_4H_2O$) moiety.

For the purpose of the present invention, the expression "furan-based polymer" is intended to denote a polycondensation polymer based on dicarboxylic acids or their derivatives in which more than 35 mol %, preferably more than 55 mol %, and still more preferably more than 75 mol % of the dicarboxylic acid component built into the polymer backbone is based on 2,5-furandicarboxylic acid or its derivative. Most preferably, the dicarboxylic acid component is based 100 mol % on 2,5-furandicarboxylic acid or its derivative. The dicarboxylic acid component built into the polymer backbone may further comprise a non-aromatic dicarboxylic acid or mixture of such acids and in case all other monomers are aromatic in nature, an aromatic dicarboxylic acid different from the 2,5-furandicarboxylic acid.

Non limitative examples of non-aromatic dicarboxylic acids are notably aliphatic dicarboxylic acids. Among them, mention can be notably made of oxalic acid [HOOC—COOH, malonic acid ($HOOC\text{—}CH_2\text{—}COOH$), adipic acid

[HOOC—(CH$_2$)$_4$—COOH], succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{12}$—COOH], cis- and/or trans-cyclohexane-1,4-dicarboxylic acid and/or cis- and/or trans-cyclohexane-1,3-dicarboxylic acid (CHDA) and their derivatives.

In the exceptional case where all monomers in the furan-based polyamide are aromatic in nature, in addition to 2,5-furandicarboxylic acid and its derivative, other aromatic dicarboxylic acids or their derivatives may be used. Examples of such other aromatic dicarboxylic acids include notably isophthalic acid (IA), terephthalic acid (TA) and orthophthalic acid (OA), 2,5-pyridinedicarboxylic acid, 2,4-pyridinedicarboxylic acid, 3,5-pyridinedicarboxylic acid, 2,2 bis(4 carboxyphenyl)propane, bis(4-carboxyphenyl)methane, 2,2 bis(4 carboxyphenyl) hexafluoro-propane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoro-propane, 2,2-bis(3-carboxyphenyl)ketone, bis(3-carboxyphenoxy)benzene, 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid, 1,2-naphthalene dicarboxylic acid and their derivatives.

The furan-based polyamide polymer (P) of the present invention is a polycondensation polymer of at least 2,5-furandicarboxylic acid and a diamine. A mixture of diamines may be used.

The at least one diamine that is used, may be an aliphatic diamine, a cyclic diamine or—if all monomers are aromatic—an aromatic diamine.

For instance, non-limitative examples of aliphatic diamines comprising preferably from 2 to 18 carbon atoms, mention can be notably made of 1,2-diaminoethane, 1,2-diaminopropane, propylene-1,3-diamine, 1,3-diaminobutane, 1,4-diaminobutane, 1,5-diaminopentane, 1,6-diaminohexane (hexamethylene diamine, or HMDA), 1,7-diaminoheptane, 2-methylpentamethylenediamine, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,8-diaminooctane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane.

Preferably, the at least one diamine comprises from 4 to 10 carbon atoms. Excellent results were obtained when 1,6-diaminohexane (also known as hexamethylene diamine or HMDA), was used. Other preferred diamines include 1,9-diaminononane, and 1,10-diaminodecane. Preferably, the preferred diamine is present in the diamine component in an amount of at least 50 mol %, based on the total number of moles of diamines present, preferably of at least 70 mol %, more preferably 100 mol %.

The diamine component may also comprise a cycloaliphatic diamine comprising from 2 to 18 carbon atoms or a mixture of (cyclo)aliphatic diamines.

Suitable cycloaliphatic diamines includes diamines such as 1,4-diaminocyclohexane, 1,2-diaminocyclohexane, isophorone diamine (also known as 5-amino-(1-aminomethyl)-1,3,3-trimethylcyclohexane), 1,3-cyclohexanebis(methylamine) (1,3-BAMC), 1,4-cyclohexanebis(methylamine) (1,4-BAMC), 4,4-diaminodicyclohexylmethane (PACM), and bis(4-amino-3-methylcyclohexyl)methane. Mixtures of aliphatic and cycloaliphatic diamines may be used.

Aromatic diamines may be used, but only in furan-based polymers where all monomers built into the polymer backbone are aromatic. Thus, the dicarboxylic acid or derivative thereof that is built into the polymer further composed of aromatic diamines is an aromatic dicarboxylic acid or derivative, which definition includes 2,5-furanedicarboxylic acid and its derivative. Preferably, the dicarboxylic acid component built into the all-aromatic furan-based polymer is 100 mol % 2,5-furandicarboxylic acid.

Among aromatic diamines, mention can be notably made of meta-phenylene diamine (MPD), para-phenylene diamine (PPD), 3,4'-diaminodiphenyl ether (3,4'-ODA), 4,4'-diaminodiphenyl ether (4,4'-ODA), meta-xylylene diamine (MXDA), and para-xylylene diamine (PXDA).

If present, the aromatic diamine is preferably meta-xylylene diamine (MXDA).

The polymerization of FDCA is not an easy task, mainly due to the decarboxylation of the FDCA at the elevated temperature at which polyamides are usually manufactured. The first attempts to polymerize FDCA were not successful and led to the synthesis of very low molecular weight polymers. The inventors found out that a process comprising a step where the FDCA or its derivative and the diamine are reacted together at a temperature of at most 100° C. to first obtain an oligomer is a way to overcome the above mentioned problems.

Excellent results were obtained when a derivative of FDCA was used. The process according to the present invention thus comprises a step where the FDCA or any of its derivatives and the at least one diamine or any of its derivatives are reacted together at a temperature of at most 100° C. to obtain an furan oligomer. The so-obtained oligomer preferably has a number average molecular weight (Mn) of at least 500 Da when determined by $^1$H-NMR.

The derivative of FDCA is preferably selected from the group consisting of the diethyl ester, the dimethyl ester, the dipropyl ester of 2,5-furandicarboxylic acid. Most preferably, it is the dimethyl ester of 2,5-furandicarboxylic acid, DMFDCA, represented by the formula below:

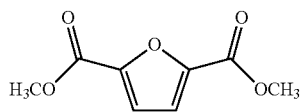 [SMILES: COC(=O)c1ccc(C(=O)OC)o1]

In case of copolymers, similar oligomers may be made with one or more non-aromatic carboxylic acid or their derivatives ("non-aromatic oligomers"). These non-aromatic oligomers may then be mixed with FDCA oligomers.

In a most preferred embodiment, the process according to the present invention comprises advantageously two distinct steps:
- in a first step, a furan oligomer is synthesized by the reaction of a di-ester of FDCA, being preferably the dimethyl ester of 2,5-furandicarboxylic acid, with at least one diamine, preferably an aliphatic diamine selected from those comprising from 4 to 10 carbon atoms
- in a second step, the oligomer obtained in the first step is reacted with FDCA and/or a non-aromatic dicarboxylic acid or a derivative thereof, being preferably the acid chloride of FDCA or adipoyl chloride to obtain the final polyamide (P). In case of an all-aromatic furan-based polyamide, an aromatic acid or derivative, being preferably the acid chloride thereof, is used.

The first step is preferably carried out in an anhydrous solvent. The solvent is preferably a polar protic solvent, which may notably be selected from n-butanol, isopropanol, ethanol and methanol. Excellent results were obtained when using methanol, the most preferred solvent. For reasons of solubility, methanol is preferably used at an amount of at least 25% w/w.

Typically, the first step is carried out with an excess of the at least one diamine. The molar ratio of the di-ester of FDCA (or non-aromatic diacid) to the diamine(s) is preferably from 0.7 to 0.95, more preferably from 0.7 to 0.9, even more preferably from 0.75 to 0.85 and most preferably of about 0.8.

The first step is advantageously carried out at a temperature of at least 0° C., preferably at least 10° C., more preferably at least 20° C., still more preferably at least 30° C., even more preferably at least 40° C. On the other side, it was discovered that the first step should not be carried out at a temperature exceeding 100° C. Excellent results were obtained when using a temperature ranging from 45 to 60° C.

The first step is typically carried out for 30 minutes to 30 hours, preferably from 1 to 20 hours, more preferably from 5 to 15 hours.

Typically, the second step is preferably carried out with an excess of the oligomer. The molar ratio of the oligomer obtained in the first step to the bifunctional linker is preferably from 1.0 to 1.5, more preferably from 1.01 to 1.10 and most preferably of about 1.05.

The second step is advantageously carried out in the presence of a hindered amine. The hindered amine is suitably a tertiary amine. Diisopropylethylamine (DIPEA), triethylamine or dimethylaminopyridine (DMAP) may be used as tertiary amine.

The second step is preferably carried out in an anhydrous solvent. The solvent is preferably a polar aprotic solvent, which may notably be selected from dimethylformamide (DMF), dimethylacetamide (DMAc), and N-methylpyrrolidone (NMP). Excellent results were obtained when using DMAc.

The second step is advantageously carried out at a temperature of at least −10° C., preferably at least −5° C., more preferably at least 10° C., still more preferably at least 15° C., even more preferably at least 20° C. Excellent results were obtained when using a first temperature ranging from −10 to 10° C. for a time ranging from 5 minutes to 5 hours, preferably from 5 minutes to 1 hour, and then using a second temperature ranging from 0 to 60° C. for a time ranging from 1 hour to 48 hours.

A preferred embodiment of the present invention therefore is as follows:

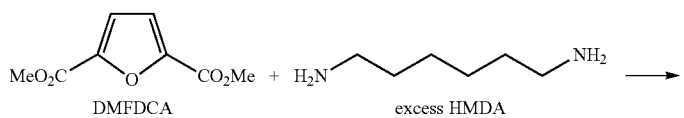
DMFDCA    excess HMDA

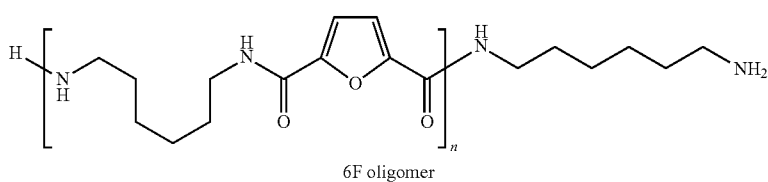
6F oligomer

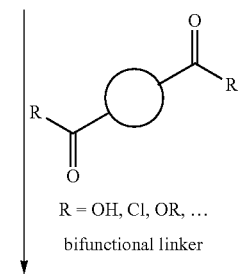
R = OH, Cl, OR, ...
bifunctional linker

-continued

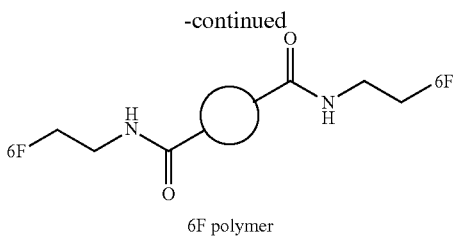

6F polymer

In the above reaction, the excess of HMDA is preferably 0.25 equivalents (weight ratio DMFDCA/HMDA=0.8). The reaction is preferably carried out at 50° C., resulting in an oligomer (6F) with n=4. The preferred bifunctional linker is furandicarboyl chloride (FDC), which results in a 6F polymer, wherein "6F" means an oligomer or polymer comprising hexa-diamine moieties and 2,5-furandicarboxyl moieties.

The oligomer obtained in the first step preferably has a number average molecular weight (Mn) of at least 500 Da when determined by $^1$H-NMR, following the NMR method described in detail in the experimental section.

The weight average molecular weight ($M_w$) is determined as follows:

$$M_w = \frac{\sum M_i^2 \cdot N_i}{\sum M_i \cdot N_i},$$

wherein $M_i$ is the discrete value for the molecular weight of a polymer molecule, $N_i$ is the number of polymer molecules with molecular weight $M_i$, then the weight of polymer molecules having a molecular weight $M_i$ is $M_i N_i$.

The polymer obtained at the end of the second step of the above detailed process step has a weight average molecular weight (Mw) of at least 25,000 Da, preferably at least 30,000 Da, more preferably at least 35,000 Da when measured by GPC, following the GPC method described in detail in the experimental section.

The process according to the present invention may optionally comprise a third step where the obtained polyamide (P) is isolated and possibly purified.

The polyamide (P) may be isolated from the reaction medium by known techniques and in particular by precipitation. In particular, the reaction medium obtained at the end of the second step may be precipitated using polar protic solvents such as water or water/alcohol mixtures.

Then, a further precipitation of the polyamide (P) may optionally be carried out to enhance the purity and/or the polydispersity index (PDI). The polymer may be purified, with improved PDI and Mn, by precipitation from HFIP/DCM using MeOH.

The polyamide (P) prepared according to the process of the present invention has advantageously a polydispersity index (PDI) of more than 1.0, preferably more than 1.5, and less than 3.5, and more preferably less than 2.5. For the purpose of the present invention, the polydispersity index (PDI) is hereby expressed as the ratio of weight average molecular weight ($M_w$) to number average molecular weight ($M_n$).

Still another aspect of the present invention relates to a composition, hereafter referred to as the polymer composition (C), comprising the above mentioned polyamide (P) and at least one other ingredient.

The at least one other ingredient is advantageously selected from the group consisting of at least another polymer, at least one reinforcing filler, mold release agents, lubricants, ultraviolet light stabilizers or UV blockers and optical brighteners.

The polymer composition (C) may further comprise at least another polymer, different from the above mentioned polyamide (P), such as polycarbonate, polyethylene glycol, polysulfone, polyesters, polyolefins, polyamideimide, polyimide, PTFE, aliphatic polyamides and aromatic polyamides such as polyphthalamide.

Non limitative examples of aromatic polyamides of the polymer composition (C), different from the polyamide (P) are: the polymer of adipic acid with meta-xylylene diamine (also known as PAMXD6 polymers, which are notably commercially available as IXEF® polyarylamides from Solvay Specialty Polymers U.S.A, L.L.C.), the polymers of phthalic acid, isophthalic acid (IA) and terephthalic acid (TA) and at least one aliphatic diamine such as 1,6-diaminohexane (notably commercially available as AMODEL® polyphthalamides from Solvay Specialty Polymers U.S.A, L.L.C.).

Non limitative examples of aliphatic polyamide polymer are notably selected from the group consisting of PA6; PA 6,6; PA 10,10; PA6,10; copolyamide PA 6,6/6; PA 11; PA 12 and PA 10,12.

Other polymers may also be present in the polymer composition (C). For example, the polymer composition (C) can further contain one or more impact modifiers. The impact modifiers can be reactive with the polyamide (P) or non-reactive. In certain specific embodiment, the polymer composition (C) contains at least one reactive impact modifier and at least one non-reactive impact modifier.

Reactive impact modifiers that may be used include ethylene-maleic anhydride copolymers, ethylene-alkyl (meth)acrylate-maleic anhydride copolymers, ethylene-alkyl (meth)acrylate-glycidyl (meth)acrylate copolymers, and the like. An example of such reactive impact modifier is a random terpolymer of ethylene, methylacrylate and glycidyl methacrylate.

Non-reactive impact modifiers that may be blended into the polymer composition (C) generally include various rubber materials, such as acrylic rubbers, ASA rubbers, diene rubbers, organosiloxane rubbers, EPDM rubbers, SBS or SEBS rubbers, ABS rubbers, NBS rubbers and the like. Particular examples of non-reactive impact modifiers include ethyl butylacrylate, ethyl (methyl)acrylate or 2 ethyl hexyl acrylate copolymers.

If present, the impact modifier is preferably present in an amount of at least 2 wt %, more preferably at least 4 wt %, still more preferably at least 5 wt %, based on the total weight of the polymer composition (C). When present, the impact modifier is also preferably present in an amount of at most 20 wt %, more preferably at most 15 wt %, still more preferably at most 10 wt %, based on the total weight of the polymer composition (C).

When added to the polymer composition (C), the other polymer is preferably present in an amount of at least 1 wt %, preferably of at least 2 wt %, more preferably of at least 3 wt %, even more preferably of at least 4 wt %, and most preferably of at least 5 wt %, based on the total weight of the polymer composition (C). Besides, the other polymer is also preferably present in an amount of at most 20 wt %, preferably of at most 15 wt %, more preferably of at most 10 wt. %, even more preferably of at most 9 wt %, and most preferably of at most 8 wt %, based on the total weight of the polymer composition (C).

The polymer composition (C) may also further comprise at least one reinforcing filler.

Reinforcing fillers are preferably fibrous. More preferably, the reinforcing filler is selected from glass fiber, carbon fiber, synthetic polymeric fiber, aramid fiber, aluminum fiber, titanium fiber, magnesium fiber, boron carbide fibers, rock wool fiber, steel fiber, wollastonite, etc. Still more preferably, it is selected from glass fiber, carbon fiber and wollastonite.

A particular class of fibrous fillers consists of whiskers, i.e. single crystal fibers made from various raw materials such as $Al_2O_3$, SiC, BC, Fe and Ni. Among fibrous fillers, glass fibers are preferred; they include chopped strand A-, E-, C-, D-, S- T- and R-glass fibers, as described in chapter 5.2.3, p. 43-48 of Additives for Plastics Handbook, 2nd ed., John Murphy.

In a preferred embodiment of the present invention the reinforcing filler is chosen from wollastonite and glass fiber. Glass fibers may have a round cross-section or an elliptic cross-section (also called flat fibers).

If present, the reinforcing filler is preferably present in an amount of at least 2 wt %, more preferably at least 4 wt %, and most preferably at least 10 wt %, based on the total weight of the polymer composition (C). When present, the reinforcing filler is also preferably present in an amount of at most 40 wt %, more preferably at most 30 wt %, and most preferably at most 20 wt %, based on the total weight of the polymer composition (C).

The polymer composition (C) may also comprise other typical ingredients of polyamide compositions such as mold release agents, lubricants, ultraviolet light stabilizers or UV blockers optical brighteners and other stabilizers.

Still another aspect of the present invention is related to articles comprising the above mentioned furan-based polyamide (P) of the current invention. In particular, one may notably mention shaped articles, fibers, coatings, films and membranes comprising such a polyamide (P).

EXAMPLES

Materials and Methods

Methanol, Dimethylacetamide (DMAc) and Diisopropylethylamine (DIPEA) were purchased as anhydrous at Sigma-Aldrich and stored in a glove box. Lithium Chloride was purchased as anhydrous and dried in an oven at 300° C. for a night and stored in a glove box. Hexamethylenediamine (HMDA) was purchased at Sigma-Aldrich, purified by distillation and stored in a glove box. Furandicarboxyl chloride (FDC) and dimethyl ester furan dicarboxylic acid (DMFDCA) were obtained from Avantium and stored in a glove box. All solvents were purchased from Sigma-Aldrich as HPLC grades.

All procedures were performed in an inert dry atmosphere.

To determine the number average molecular weight of the oligomers, $^1$H-NMR was used, while GPC was used to measure the weight average molecular weight of the final polymers. Those two methods were carried out as described below.

The glass transition temperature (Tg) of the polyamide was measured according to ASTM E1356 using a Mettler Toledo DSC1 Differential Scanning calorimeter and Liquid Nitrogen Cooling System operated with STARe software version 10.00d. The instrument was calibrated using a heating and cooling rate of 10° C./min in nitrogen atmosphere. The measurements were also carried out using a heating and cooling rate of 10° C./min in nitrogen atmosphere. Two heating cycles were performed and the Tg was measured during 2nd heating cycle. Each Tg was determined by a certain construction procedure on the heat flow curve: a first tangent line to the curve above the transition region was constructed; a second tangent line to the curve below the transition region was also constructed; the temperature on the curve halfway between the two tangent lines, or ½ delta Cp, was the Tg reported in the tables below.

The melting temperatures (Tm) were determined by DSC, according to ASTM D3418.

The degradation temperatures (Td) were measured by Thermogravimetric Analysis (TGA) using a Mettler Toledo TGA/SDTA851e. For this purpose, it was checked that the TGA was well-calibrated by means of a calibration sample. Then, the polymer of which the degradation temperature had to be measured was submitted to the following cycle: Heating from room temperature up to 500° C. at a rate of 10° C./min. As the polymer was heated, weight loss of the sample was monitored. The degradation temperature was determined by taking the first derivative of the weight loss curve versus temperature.

The polydispersity index (PDI) was calculated by dividing the ratio of weight average molecular weight ($M_w$) to the number average molecular weight ($M_n$).

The molecular weights and weight distribution were determined by Gel permeation chromatography (GPC). GPC is a type of size exclusion chromatography (SEC), that separates analytes on the basis of size. The technique is often used for the analysis of polymers, including polyamides. For instance, polyamide analysis may be carried out on a calibrated Agilent PL HFIP gel using 1,1,1,3,3,3-hexafluoro-2-isopropanol as solvent, as described by Greg Saunders and Ben MacCreath of Agilent Technologies in 5991-0485EN of May 10, 2012 on the internet: http://www.chem.agilent.com/Library/applications/5991-0485EN.pdf.

The inherent viscosity was determined using a Cannon-Fenske viscometer tube size 100 at 25.0° C. (thermostated bath) using a 0.5 wt % polymer solution in m-cresol. For the polymer 75 milligram was dissolved in 15 milliliter of m-cresol and for the blank only m-cresol was used. The polymer solution and the blank were measured 3 times and the average time in seconds was calculated. The inherent viscosity is calculated using the following equation:

$$n = \frac{\ln\left(\frac{t}{t0}\right)}{c} = \frac{\ln\left(\frac{549.0}{361.3}\right)}{0.501} = 0.83$$

wherein t is the time (in seconds) for the polymer solution, t0 is the time for the blank and c the concentration.

The oligomer was analyzed by $^1$H-NMR in TFA-d (deuterated trifluoroacetic acid), signal at 7.41 ppm set to 2H (7.4 ppm 2H, 3.6 ppm 4H, 3.2 ppm 1H, 1.8 ppm 5H, 1.5 ppm 5H), special attention has to be given to the methyl ester signal at 4.11 ppm, the methanol signal at 4.10 ppm and the N-methylation signals in the 3.2-3.0 ppm region. The degree of polymerization was determined by the formula integral at 3.65 pp (═CH$_2$—N—C(O)—)/integral at 3.30 ppm (═CH$_2$—NH$_2$). The percentage of amine is: % amine=integral at 3.30 ppm/integral at 3.65 ppm. The Mn of the amine-terminated oligomer was calculated from the % amine value determined by the above listed $^1$H-NMR method according to the following formula: Mn=116+((100/% amine)*236).

Oligomer Synthesis

In a glove box to a 250 ml round bottom flask:
20.0 gram (108.6 mmol) of DMFDCA
15.7 gram (135.7 mmol, 1.25 eq.) of HMDA
36.0 ml of anhydrous methanol were added.

The flask was capped with a septum or a stopper and transferred to a fume hood. In a closed system under nitrogen atmosphere the solution was heated at 50° C. overnight, while stirred with a magnetic stirrer bar. The next day a waxy white solid was obtained which was crushed to small particles. The particles were dried for 19 h at 50° C. under vacuum to yield 28.1 gram (100% yield) of a white solid.

The intrinsic viscosity, $\eta_{inh}$=0.18 at c=0.5 g/dl in m-cresol. By differential scanning calorimetry (DSC) a glass transition temperature Tg of 77° C. was observed. The % amine was 25%; the degree of polymerization (DP) was 4.

Further Oligomer Syntheses

Under an inert atmosphere were added to a septum-capped 30 mL glass vial 1.00 gram (5.4 mmol) of DMFDCA, and 5.5 to 6.75 mmol of HMDA (1.02 to 1.25 equivalent) and 1.7 mL of anhydrous methanol. The suspension was heated to an elevated temperature as indicated in Table 1 for a period as shown in Table 1. After the reaction period a nitrogen stream was applied through the overhead of the vial. The methanol was removed by distillation. A white solid appeared and was isolated before being dried for 19 hr at 50° C. under vacuum to yield the oligomer. Samples thereof were analyzed by $^1$H-NMR. Some experiments were conducted without the addition of methanol. The results are shown in Table 1.

TABLE 1

| HMDA, equiv. | Temperature, ° C. | Time, hr | Solvent | % N-methyl | % amine | DP |
|---|---|---|---|---|---|---|
| 1.10 | 80 | 5 | Methanol | 1.61 | 12 | 8.3 |
| 1.10 | 70 | 3 | Methanol | 0.53 | 12 | 8.3 |
| 1.10 | 50 | 3 | Methanol | 0.79 | 14 | 7.1 |
| 1.10 | 50 | 1 | None | 1.54 | 24 | 4.2 |
| 1.02 | 50 | 19 | Methanol | 0.27 | 6 | 16.7 |
| 1.25 | 50 | 3 | None | 0.18 | 22 | 4.5 |
| 1.25 | 50 | 19 | Methanol | 0.11 | 25 | 4.0 |
| 1.25 | 70 | 3 | Methanol | 0.29 | 26 | 3.8 |
| 1.25 | 120 | 1 | Methanol | 2.32 | 25 | 4.0 |

The above results show that when the excess of HMDA is at least 1.05 the oligomer is obtained with a degree of polymerization of 1 to 10. At a reaction temperature above 100° C., the amount of N-methylation becomes above 2.0% and thus unsatisfactory.

In addition to the above experiments, a series of melt oligomerization experiments was performed without solvent, whereby the temperature of the reaction was varied. Strong temperature dependence was observed; the higher the temperature, the more N-methylation occurred. N-methylation is undesirable. Thus, N-methylation of the amine i) disrupts the hydrogen bonding between the polyamide chains, leading to loss of favorable physical properties and ii) alkylated amines function as chain stoppers. Experimentation thus revealed that the temperature should preferably be at least 30° C., to less than 90° C., more preferably at least 40° C. to less than 80° C. Results are shown in Table 2.

TABLE 2

| HMDA, equiv. | Temperature, ° C. | N-methyl, % | DP |
|---|---|---|---|
| 1.10 | 160° C. | 14 | — |
| 1.10 | 135° C. | 11 | — |
| 1.10 | 120° C. | 10 | — |
| 1.10 | 110° C. | 6 | — |
| 1.10 | 100° C. | 4 | — |
| 1.10 | 90° C. | 2.5 | — |
| 1.10 | 50° C. | 1.5 | 4.2 |

In addition to the above experiment, a series of oligomerization experiments were performed with different solvents. The reaction was performed at 70° C. for 3 hr. The results are shown in Table 3.

TABLE 3

| HMDA, equiv. | Solvent | % DMFDCA | % acid | % N-methyl |
|---|---|---|---|---|
| 1.05 | H$_2$O | 0 | 30 | 0 |
| 1.05 | MeOH | 6 | 0.62 | 0.54 |
| 1.05 | EtOH | 24 | 0.45 | 0.47 |
| 1.05 | iPrOH | 24 | 1.29 | 1.44 |
| 1.05 | MeCN | 17 | 3.14 | 3.62 |
| 1.05 | CHCl$_3$ | 25 | 2.93 | 2.89 |
| 1.05 | PhCH$_3$ | 23 | 2.53 | 2.60 |
| 1.05 | DCE | 46 | 1.62 | 2.07 |
| 1.05 | MEK | 43 | 4.65 | 11.8 |
| 1.05 | DMAc | 21 | 6.72 | 2.61 |
| 1.05 | NMP | 19 | 5.11 | 2.54 |

Surprisingly, methanol gave the highest conversion (94%) even at a low excess of HMDA (1.05 eq) and at 70° C. the amount of N-methylation is low at <1%. Other solvents tested, H$_2$O, EtOH, iPrOH, MeCN, CHCl$_3$, PhCH$_3$, DCE, MEK, DMAc, NMP, gave lower conversions and much higher amounts of N-methylation.

Polymer Synthesis

Under a nitrogen atmosphere to a 100 ml round bottom flask:
1.5006 gram (1.414 mmol) of 6F-oligomer with a DP of 4
17 ml of anhydrous DMAc
0.3015 gram (7.11 mmol, 5.0 eq.) of LiCl
0.75 ml (4.30 mmol, 3.0 eq.) of DIPEA were added.

Stirring was started with a magnetic stirrer bar, and (most of) the oligomer was dissolved. The resulting reaction mixture was cooled to 0° C. 0.259 gram (1.343 mmol, 0.95 eq.) of FDC was added at once and allowed to react at 0° C. for 10 min. The reaction mixture was allowed to come to room temperature and stirred over the weekend. The clear solution was poured into 0.5 L of water and stirred for 1 h. The solids were filtered and washed twice with 0.5 L of water for 1 h at 60° C. The solids were cooled with liquid nitrogen and crushed to fine particles. The particles were washed with 150 ml of water for 1 h at 80° C., and subsequently were washed twice with 150 ml of water for 1 h at 50° C. (removal of excess DMAc). The particles were dried for 19 h at 50° C. under vacuum to yield 1.4 gram (82% yield) of a white solid.

The polymer was analyzed by 1H-NMR in TFA-d. The ηinh=0.83 at c=0.5 g/dl in m-cresol. In DSC a Tg of 136° C. was observed but no Tm. With thermogravimetric analysis (TGA) a decomposition temperature Tdec (@5% wt loss) of 405° C. is observed. With gel permeation chromatography the Mn was determined at 7,101 and the Mw 37,476, with a corresponding PDI of 5.28.

Other solvents that may be used include DMF, NMP, HMPA, HMPT, and DMSO. Moreover, instead of DIPEA, triethylamine or DMAP may be used as tertiary amine. As solubilizing agent any combination of LiCl, LiBr, $CaCl_2$ and/or $CaBr_2$ may be used.

Comparative Experiments

In accordance with the prior art described in the introduction of this patent application various furan based polyamides were made. In particular, polyamides were made in accordance with the teachings of the references of Hoff et al., Heertjes et al, Grosshardt et al., Ghandini et al. (Macromolecules 1991, p. 830), and Morgan et al. (Macromolecules 1975 (8), p. 104). The prior art methods proved to be unsuccessful due to decarboxylation, N-methylation, formation of cyclic oligomers or hydrolysis.

The invention claimed is:

1. A process for preparing a furan-based polyamide, said process comprising the following steps:
   (1) preparing a furan-based oligomer of formula (1)

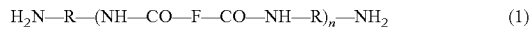   (1)

wherein R is a residue of an aliphatic diamine having from 4 to 10 carbon atoms, or of meta-xylylene diamine and F is a furan moiety and n represents the average degree of oligomerization, and wherein n is within the range of 1 to 10,
   by reacting 2,5-furandicarboxylic acid or its derivative with a diamine at a temperature of at most 100° C.;
   (2) contacting the oligomer of step (1) with a bifunctional linker selected from an acid or a derivative thereof wherein the acid is furandicarboxylic acid or a non-aromatic dicarboxylic acid; provided that if the hydrocarbon moiety R is the residue of meta-xylylene diamine then the bifunctional linker is an aromatic dicarboxylic acid or a derivative thereof, at a mole ratio of the oligomer to the difunctional linker within the range of about 0.8 to about 1.5 at polycondensation conditions, and
   (3) isolating the resulting polyamide.

2. The process of claim 1, wherein the reaction of step (1) is carried out at a temperature in the range of about 45 to about 60° C.

3. The process of claim 1, wherein the reaction of step (1) is carried out in an anhydrous solvent.

4. The process of claim 1, wherein in the reaction of step (1) an excess of diamine is used.

5. The process according to claim 4, wherein the molar ratio of the 2,5-furandicarboxylic acid or its derivative to the diamine is from about 0.7 to about 0.95.

6. The process of claim 1, wherein in step (2) the molar ratio of the oligomer and the difunctional linker is from about 1.0 to about 1.5.

7. The process of claim 1, wherein step 2 is carried out in the presence of a hindered amine.

8. The process of claim 1, wherein step 2 is carried out in an anhydrous solvent.

9. The process of claim 1, wherein step 2 is carried out at a temperature of about 0 to about 60° C.

10. A furan-based oligomer of formula (1), as prepared by process step (1) of claim 1:

   (1)

wherein R is a residue of an aliphatic diamine having from 4 to 10 carbon atoms, or of meta-xylylene diamine and F is a furan moiety and n represents the average degree of oligomerization, and wherein n is within the range of 1 to 10.

11. The furan-based oligomer of claim 10, wherein n is from 2 to 7.

12. A composition comprising the polyamide prepared in the process according to claim 1 and at least another ingredient selected from the group consisting of another polymer, a reinforcing filler, a mold release agent, a lubricant, an ultraviolet light stabilizer, UV blocker an optional brightener and a combination thereof.

13. Articles comprising the polyamide prepared in the process according to claim 1 as shaped article, fiber, coating, film or membrane.

14. The process of claim 3, wherein the anhydrous solvent is methanol.

15. The process according to claim 4, wherein the molar ratio of the 2,5-furandicarboxylic acid or its derivative to the diamine is from about 0.75 to about 0.85.

16. The process according to claim 4, wherein the molar ratio of the 2,5-furandicarboxylic acid or its derivative to the diamine is about 0.8.

17. The process of claim 6, wherein in step (2) the molar ratio of the oligomer and the difunctional linker is from about 1.01 to about 1.10.

* * * * *